(12) United States Patent
Savvides et al.

(10) Patent No.: US 12,131,260 B2
(45) Date of Patent: *Oct. 29, 2024

(54) DISCRIMINATIVE COSINE EMBEDDING IN MACHINE LEARNING

(71) Applicant: Carnegie Mellon University, Pittsburgh, PA (US)

(72) Inventors: Marios Savvides, Pittsburgh, PA (US); Dipan Kumar Pal, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/132,509

(22) Filed: Apr. 10, 2023

(65) Prior Publication Data
US 2023/0281454 A1    Sep. 7, 2023

Related U.S. Application Data

(63) Continuation of application No. 16/299,498, filed on Mar. 12, 2019, now Pat. No. 11,636,344.

(60) Provisional application No. 62/761,144, filed on Mar. 12, 2018.

(51) Int. Cl.
*G06N 3/084* (2023.01)
*G06F 17/16* (2006.01)
*G06N 20/00* (2019.01)

(52) U.S. Cl.
CPC ............ *G06N 3/084* (2013.01); *G06F 17/16* (2013.01); *G06N 20/00* (2019.01)

(58) Field of Classification Search
CPC .. G06N 3/00; G06N 5/00; G06N 7/00; G06N 20/00; G06N 99/00
See application file for complete search history.

(56) References Cited

PUBLICATIONS

Cai, J., Meng, Z., Khan, A., Li, Z., O'Reilly, J., & Tong, Y.. (2017). Island Loss for Learning Discriminative Features in Facial Expression Recognition. (Year: 2017) (Year: 2017).*
Yu Liu and Hongyang Li and Xiaogang Wang (2017). Learning Deep Features via Congenerous Cosine Loss for Person Recognition. CoRR, abs/1702.06890. (Year: 2017) (Year: 2017).*
Wen, Y. (2016). A Discriminative Feature Learning Approach for Deep Face Recognition. In Computer Vision—ECCV 2016 (pp. 499-515). Springer International Publishing. (Year: 2016) (Year: 2016).*
Shun Zhang, Yihong Gong, & Jinjun Wang (2016). Deep Metric Learning with Improved Triplet Loss for Face Clustering in Videos. In PCM. (Year: 2016) (Year: 2016).*

* cited by examiner

*Primary Examiner* — Ben M Rifkin
*Assistant Examiner* — Johnathan R Germick
(74) *Attorney, Agent, or Firm* — KDW Firm PLLC

(57) ABSTRACT

During training of deep neural networks, a Copernican loss ($L_C$) is designed to augment a primary loss function, for example, a standard Softmax loss, to explicitly minimize intra-class variation and simultaneously maximize inter-class variation. Copernican loss operates using the cosine distance and thereby affects angles leading to a cosine embedding, which removes the disconnect between training and testing.

11 Claims, 3 Drawing Sheets

DISCRIMINATIVE COSINE EMBEDDING IN MACHINE LEARNING

RELATED APPLICATIONS

This application is a continuation-in-part of U.S. patent application Ser. No. 16/299,498, filed Mar. 12, 2019, which claims the benefit of U.S. Provisional Application No. 62/761,144, filed Mar. 12, 2018, the contents of which are incorporated herein by reference in their entireties.

GOVERNMENT RIGHTS

This invention was made with government support under contract 20131JCXKO05, awarded by the U.S. Department of Justice and contract W911 NF16C0040, awarded by the U.S. Army. The government has certain rights in the invention.

BACKGROUND OF THE INVENTION

Recent developments in deep neural networks have addressed a wide array of components. Considerable effort has been directed to developing deeper structures and more effective non-linearities. Apart from structural developments, there have also been efforts directed to combating over-fitting and obtaining better gradients. Recent studies have recognized the importance of stronger loss functions. A robust loss function which encourages highly discriminate feature learning is a direct way to provide a network with more informed gradients towards the ultimate supervised task. A fully connected layer coupled with the cross-entropy loss and the Softmax layer, which is referred to collectively as the Softmax loss herein, is arguably the most prevalent prior art loss function. The Softmax loss has proved to be versatile and is able to provide reasonably good gradients owing to the well-behaved cross-entropy loss. Some efforts have been directed to modifying the Softmax loss to increase discrimination in terms of larger angular margins, or to normalizing the features input to Softmax, thereby solving a non-convex problem.

A different way to obtain highly discriminative features involves minimizing alternate loss functions or augmenting the Softmax with supplementary losses. Constrastive loss and the Triplet loss replace the Softmax loss with losses which focus on learning a discriminative embedding while trying to minimize intra-class variation in the learned features. This is accomplished by sampling training pairs or triplet sets which leads to expensive hard-sample mining in large-scale applications. Center loss on the other hand, is an approach which ignores hard-sample mining while only trying to minimize intra-class variation along with the Softmax loss. Another approach, which was proposed to work on random batches, is the Multi-batch estimator. Multi-batch is an example of the metric learning approach which, for a batch size of m, utilizes all m2-m pairs for a better estimate of the gradient.

The aforementioned works all operate in the $l_2$ or Euclidean space. Although $l_2$ embeddings perform well in many applications, the performance gain they provide is limited in situations wherein the number of samples per class is high. In such situations, forcing all samples from a class to converge toward each other in the $l_2$ sense is too difficult a task because it requires that the network converge not only in angle but also the norm of the features.

Further, during testing in typical supervised classification such as face recognition, the most common metric is the cosine distance which ignores the norm. This creates a disconnect between training and testing because the network learns a behavior (to constrain the norm as well) that is ignored during testing. Such a framework is inefficient.

Recently, congenerous cosine ("COCO"), a form of cosine loss, was proposed for person recognition. COCO minimizes intra-class variation center and maximizes inter-class variation of samples with the centers of other classes as opposed to the global batch center, which significantly raises computational complexity. The approach uses hard normalization and is similar to recent other studies, all of which formulate a non-convex constraint.

SUMMARY OF THE INVENTION

The Copernican Loss ($L_C$) disclosed herein has two important properties. First, $L_C$ is designed to augment the standard Softmax loss while explicitly minimizing intra-class variation and simultaneously maximizing inter-class variation. Second, $L_C$ operates using the cosine distance and thereby directly affects angles leading to a cosine embedding, which removes the disconnect between training and testing. This improves efficiency because more of the model complexity is utilized to learn a more discriminative embedding rather than learning to constrain the norm.

Copernican loss does not require hard sample mining or data augmentation of any kind and can be effectively minimized using stochastic gradient descent (SGD) on random mini-batches. $L_C$ only needs to maintain a center for each class called the "Planet center" and computes the mean of the mini-batch called the "Sun center". To minimize intra-class variation, it minimizes the cosine distance of the samples to their corresponding Planet centers. To discriminate between the samples within a minibatch, Copernican loss maximizes the cosine distance of the samples away from the mean of the mini-batch (the Sun center). This eliminates the need to compute pair-wise gradients such as the Multi-batch while providing the similarly discriminative gradients in a more efficient manner.

DETAILED DESCRIPTION

Figure 1:
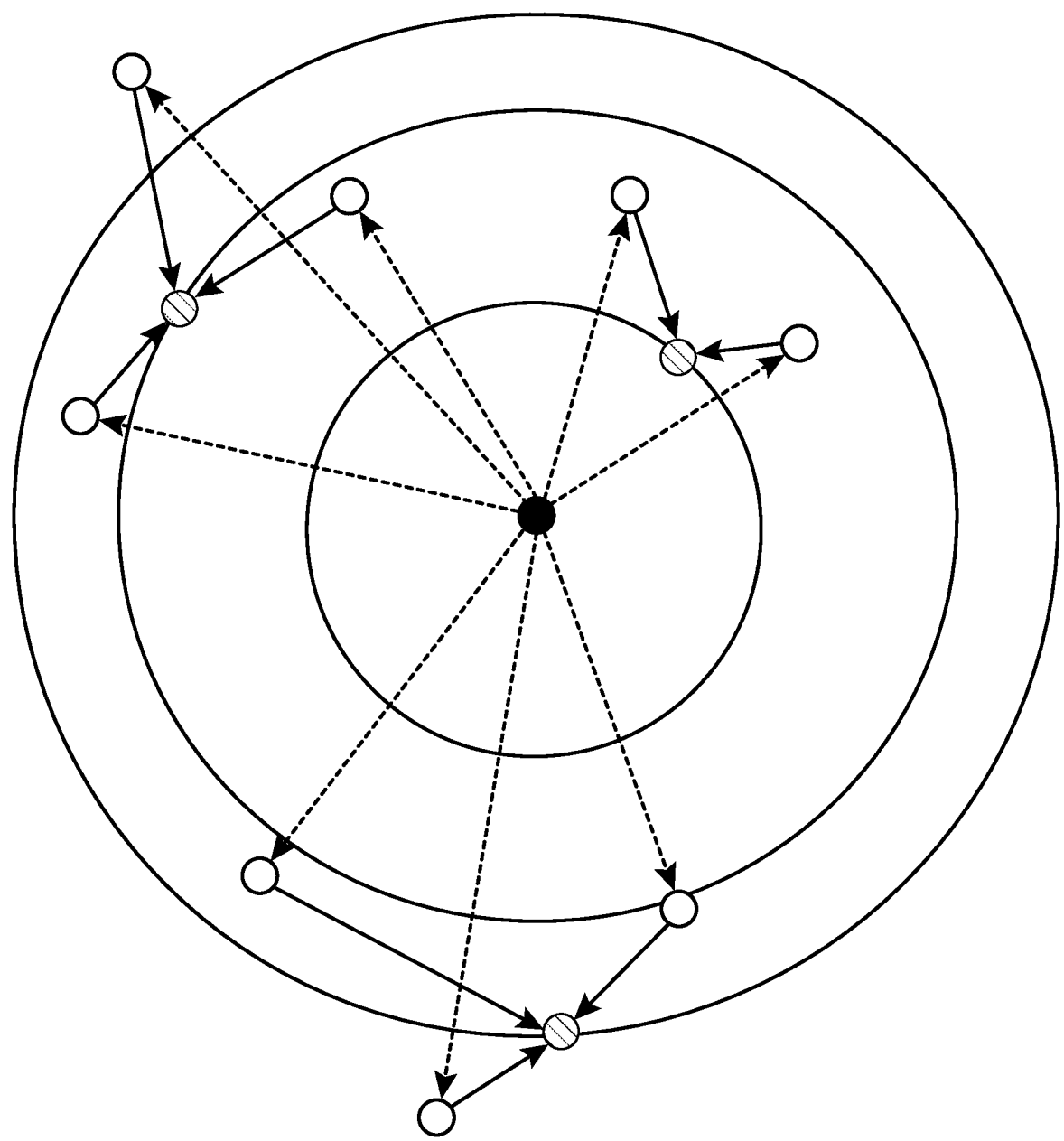
FIG. 1 shows a sample batch in 2d space comprising 8 samples, represented by hollow circles, in 3 classes, represented by solid circles. The solid dark circle in the center represents the global batch center (i.e., the "Sun").

Copernican loss minimizes the sum of planet loss and sun loss. Planet loss minimizes the intra-class variation and pushes the samples towards the class centers under the angular or cosine metric. Sun loss maximizes the inter-class variation by moving all samples away from the global batch center. An example of this is shown in FIG. 1A, which shows a sample batch in of 2D features in 2D space comprising eight samples in three classes. The dotted black lines denote the gradient direction for the sun loss and the solid thin lines denote the gradient direction from planet loss.

Note that the Copernican loss is a secondary loss function intended to be used with and enhance the performance of a primary loss function ($L_{primary}$). While the various embodiments are explained in the context of the use of SoftMax as the primary loss function, one of skill in the art should realize that other well-known loss functions could also be used as the primary loss function, with the Copernican loss as the secondary loss function. Other example of loss functions that could serve as the primary loss function include, but are not limited to: L2-Softmax, Large Margin Softmax, Angular Softmax, NormFace, AM-Softmax Cos-Face, ArcFace and Circle loss.

The Need for Simultaneous Discrimination and Invariance. Learning robust features is a key problem in supervised learning. Robustness, as used herein, refers to two specific properties of a useful feature. 1) Invariance to intra-class nuisance transformations while being 2) discriminative to inter-class transformations. Although loss functions exist which implicitly optimize for this criterion, such as the Softmax loss and negative log likelihood, the features learned using pure forms of the loss functions are not robust enough for harder classification tasks. Thereby, explicit simultaneous maximization of intra-class similarity and inter-class discrimination is critical. In contrast to some known loss functions, Copernican loss explicitly optimizes for both objectives (invariance and discrimination) between all samples in a mini-batch. Although, constrastive embedding and Triplet loss both advocate simultaneous optimization of discrimination and invariance, they search for useful gradients through sample mining.

One way to mitigate the need for mining is to discriminate all samples belonging to different classes away from each other. Copernican loss does this by moving the samples away from the global batch mean, which efficiently provides discriminative gradients without sample mining.

The Need for a Cosine Embedding. Classification in machine learning, at its fundamental level, is typically conducted using the inner-product. The inner-product between the weight vector $\omega$ and the sample x is a product of their norms and the cosine of the angle between the two vectors. The ideal classification vector $\omega$ would provide a high inner-product with a sample from the correct class and a low inner-product for samples from impostor classes. Thus it is desirable that $\omega^T x_{correct} > \omega^T x_{imposter} \Rightarrow \|x_{correct}\|_2 \cos(\theta_{correct}) > \|x_{imposter}\|_2 \cos(\theta_{imposter})$. The classification decision therefore, ultimately rests on the norm of the sample x and the cosine angle of the weight vector. In this light, there are two ways of increasing discrimination. 1) Increase the norm of the correct class; and/or 2)decrease the cosine angle between the weight vector and the sample. For binary class problems, increasing the norm of one class over another may be feasible, however for multi-class problems this approach would not be effective.

Maximizing the norm of samples from one particular class over all others, would hinder correct classification of other classes. Thereby, one approach to increase discrimination that can be applied to multi-class problems is to maximize the angle (or equivalently the cosine distance) between classes. This reasoning also applies to the Softmax loss function which is arguably the most commonly used loss in supervised deep learning. Minimizing the intra-class cosine distance while simultaneously maximizing the inter-class cosine distance is optimized by the Copernican loss disclosed herein.

Limitations on an $l_2$ embedding. There have been multiple loss functions proposed that learn an $l_2$ embedding such as the Center loss, Triplet loss and Multi-batch. These losses explicitly minimize the $l_2$ distance between samples from the same class. For sample features $x_1$ and $x_2$ from the same class, $\|x_1-x_2\|_2^2 = \|x_1\|_2^2 - 2\|x_1\|_2\|x_2\|_2 \cos(\theta)$, where $\theta$ is the angle between the two samples. Minimizing this quantity requires both minimizing the difference between norm of the features $x_1$ and $x_2$ and also minimizing the cosine distance between the two. There are two downsides to this approach.

The first downside is that, during testing and extraction of a similarity score (e.g. for open set face or object feature extraction), only the cosine distance is taken into account. This implies that explicitly constraining the norm is inefficient for the loss function layer from the perspective of matching because the model needs to learn sub-tasks (i.e., constraining the norm) that is not required during testing. Successful approaches, such as batch normalization, do not require the model or the weights themselves to perform normalization; it is instead performed explicitly through the normalization operation. This allows the model complexity to be used to focus on the angles between the samples.

The second downside is that, for tasks with a large number of samples per class (such as typical object recognition), having a large set of samples per class all converge to the same point in the Euclidean sense proves to be a difficult challenge for a deep network. It is much easier to simply have the angle of the sample features converge as opposed to convergence in the $l_2$ sense. With this approach, the network does not need to constrain norms, and model complexity is better utilized in creating a larger angular margin resulting in better performance during testing.

This is likely the reason that none of the previous works on learning $l_2$ embeddings report results on object recognition datasets with a large number of samples per class. Examples include datasets such as CIFAR10 and CIFAR100 which have fewer classes (10 and 100 respectively) but many more samples per class (6000 and 600 images per class respectively).

The focus of those works is mainly face recognition which is characterized by a large number of classes (e.g. above 10,000 for CASIA-WebFace) with relatively few samples per class (average of about 50 samples per class for CASIA-WebFace).

Copernican Loss—For a batch of size m, Copernican loss, denoted by $L_C$, is defined as the sum of three loses as follows:

$$L = L_{Primary} + \lambda \left( \underbrace{\frac{1}{m}\sum_k^m (1 - \cos(x_i, p_{y_i}))}_{L_P} \right) \quad (1)$$

$$+ \left( \underbrace{\frac{1}{m}\sum_k^m \max(0, \cos(x_i, s), \beta)}_{L_P} \right) \quad (2)$$

Here, $L_P$ is the Planet loss minimizing intra-class cosine variation, $L_S$ is the Sun loss, maximizing inter-class cosine variation and $L_{primary}$ is, in one embodiment, the Softmax loss. $\beta$ is the margin for the Sun loss, s is the global center for the particular batch (i.e., the "sun") and the p's are the class centers (i.e., the "planets").

In the ideal case, s and p's would represent the class centers and the global center of the entire dataset. However, computing these quantities over the entire dataset would be very expensive, especially for large-scale applications. To get around this problem, the global center (sun s) of the entire dataset can be approximated with the global center of each mini-batch. Therefore, for every batch, $$s = \frac{1}{m}\sum_{i}^{m} x_i.$$

The computation of the class centers (planets p) also face a similar issue due to scale. However, class centers cannot be effectively estimated using a single batch due to high variance, especially in the early stages of training. One way to obtain a better estimate is to maintain a class center and update it with every batch in the following sense, $$p_{y_i}^{j+1} p_{y_i}^{j} + \alpha \frac{1}{n} x_i$$

Here, it is assumed that there are n instances of class i in the minibatch and a is the update weight factor and is usually set to a small value (say 0.05). Compared to direct computation of class centers over the mini-batch set, this update provides more robustness to sample perturbation while simultaneously addressing the problem of scalability in estimating the centers. Copernican loss is simple to implement and, unlike Triplet loss, it does not require hard sampling mining which would have increased the computation complexity of the overall loss. Further, computation of discriminative gradients only requires m gradient computations compared to m(m-1) for Multi-batch.

Figure 2:
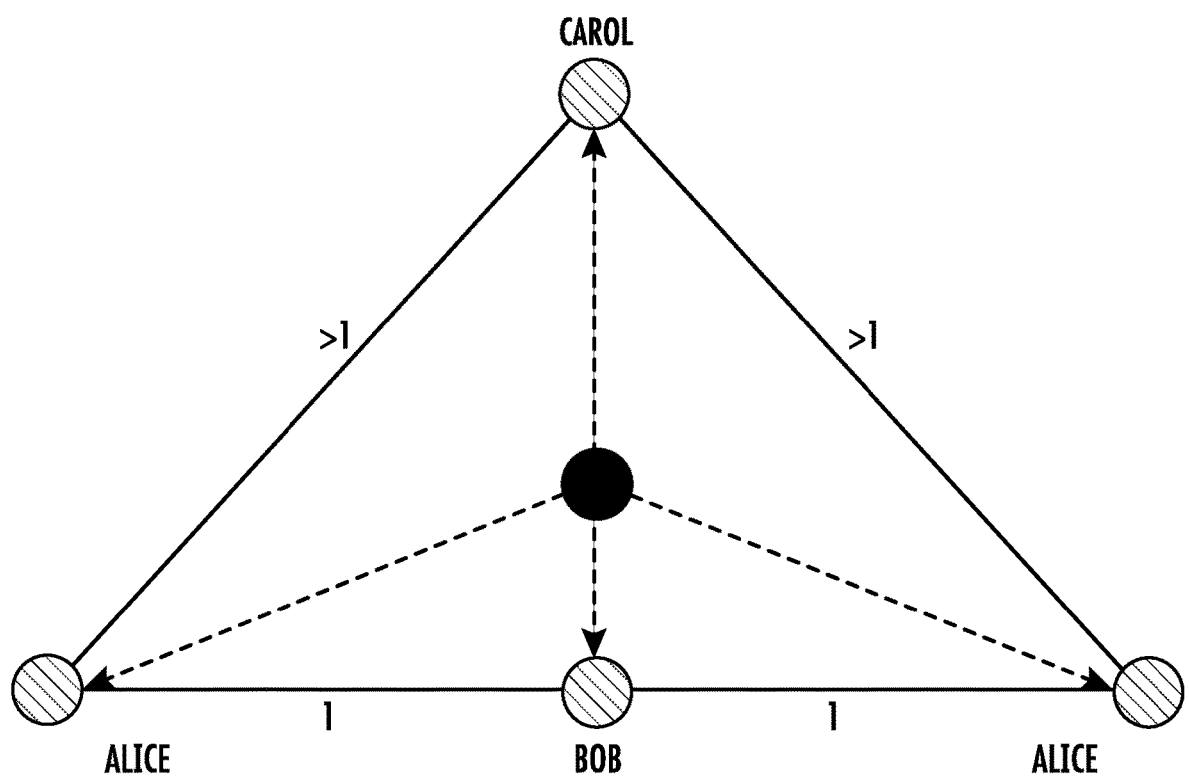
FIG. 2 shows an example of an ambiguous configuration.

Resolving an Ambiguous Configuration. An example of an ambiguous configuration is shown in FIG. 2. Here, four samples are mapped into the feature space during early training when classes are mixed. The algorithm needs to pick pairs of samples from different classes to take a gradient step towards better discrimination. Picking the Alice-Carol pair would not help the configuration as they have sufficient separation (>1) and neither will Bob-Alice pairs. Only Carol-Bob pairs will provide useful updates by moving Bob away. Center loss would worsen things since it will push the two Alice's closer to Bob. Triplet loss would need to sample Carol-Bob, which is expensive to determine by hard-sample mining and unlikely to determine if no sample mining is performed. Multi-batch solves this problem by considering all pairs in the minibatch. Copernican loss is guaranteed to provide discriminative gradients for all samples without the need for sample mining or m(m−2) gradient computations (only m are needed), because it moves samples away from the sun center (i.e., the black dot in FIG. 2). To bring the Alice pair closer, planet loss provides a gradient which will be effective since Bob has moved out of the way due to the sun loss.

Optimization—The gradients of Copernican loss are straight forward. Since the sun center and planet centers are updated during the forward pass, only gradients with respect to the input $x_i$ are required to be derived which are as follows:

$$\frac{\partial L_P}{\partial x_i} = -\frac{1}{m}\sum_{i}^{m} \frac{1}{\|x_i\|_2}\left(\frac{p_{y_i}}{\|p_{y_i}\|_2} - \cos(x_i, p_{y_i})\frac{x_i}{\|x_i\|_2}\right) \quad (3)$$

$$\frac{\partial L_S}{\partial x_i} = \left\{\frac{1}{m}\sum_{i}^{m} \frac{1}{\|x_i\|_2}\left(\frac{s}{\|p_{y_i}\|_2} - \cos(x_i, s)\frac{x_i}{\|x_i\|_2}\right) \atop 0\right. \quad (4)$$

Figure 3:
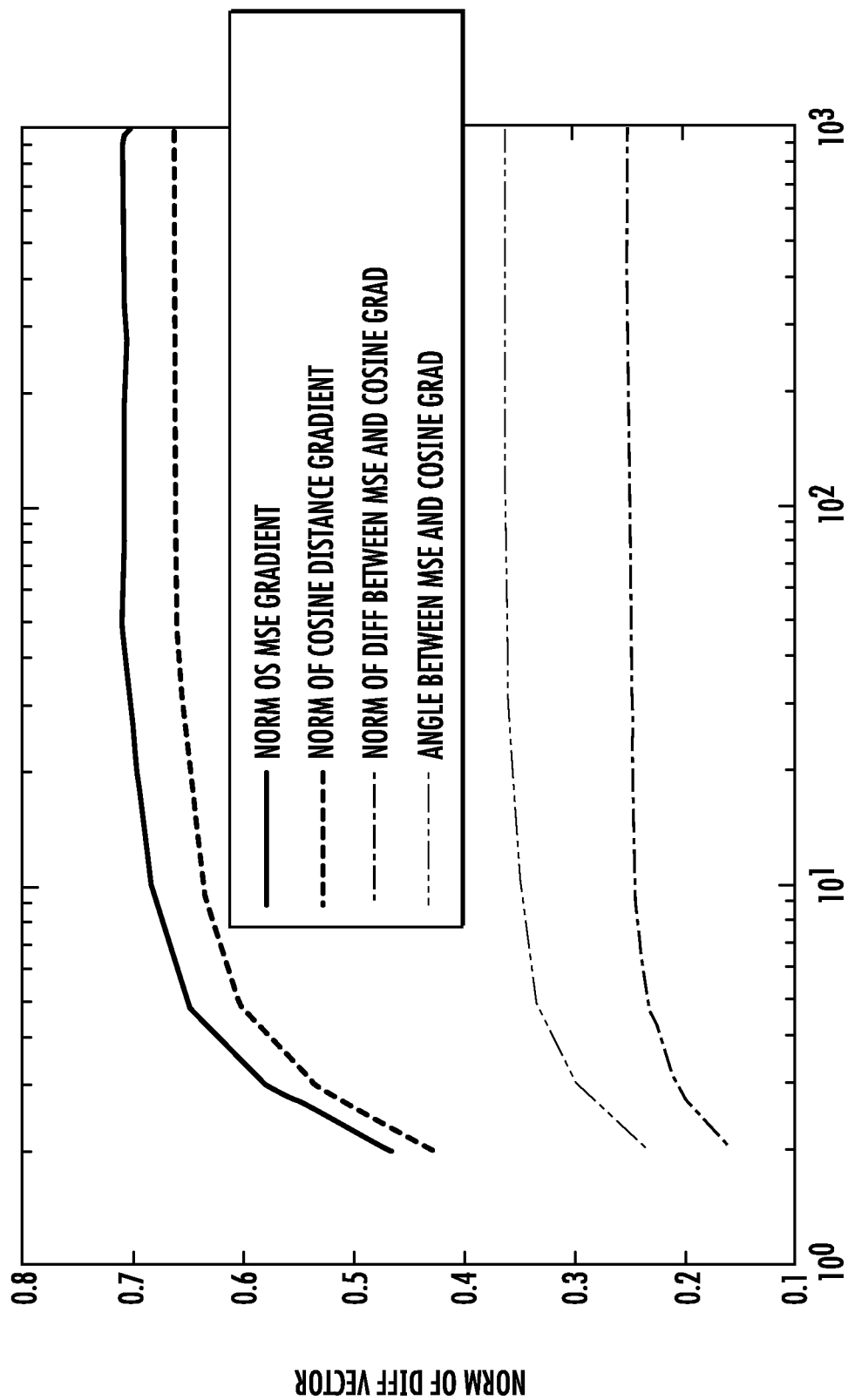
FIG. 3 is a graph showing the norm of the difference between the MSE gradient and the cosine similarity gradient as dimensionality increases along with the angle between the two

Optimization—The gradients of Copernican loss are straight forward. Since the sun center and planet centers are updated during the forward pass, only gradients with respect to the input $x_i$ are required to be derived which are as follows:

$$\frac{\partial L_P}{\partial x_i} = -\frac{1}{m}\sum_{i}^{m} \frac{1}{\|x_i\|_2}\left(\frac{p_{y_i}}{\|p_{y_i}\|_2} - \cos(x_i, p_{y_i})\frac{x_i}{\|x_i\|_2}\right) \quad (3)$$

$$\frac{\partial L_S}{\partial x_i} = \left\{\frac{1}{m}\sum_{i}^{m} \frac{1}{\|x_i\|_2}\left(\frac{s}{\|s\|_2} - \cos(x_i, s)\frac{x_i}{\|x_i\|_2}\right)\right. \quad (4)$$

where $$\frac{\partial L_S}{\partial x_i}$$

becomes 0 only if $\cos(x_i, s)<\beta$. It is interesting to note that the gradient direction of the cosine similarity is different from the mean squared error (MSE) gradient by a scaled version of the sample feature. This scaling factor is the cosine angle between the sample feature and the target vector. FIG. 3 shows the norm of the difference between the MSE gradient and the cosine similarity gradient as dimensionality increases along with the angle between the two. For all dimensions above 10, the angle between the cosine similarity gradient and MSE gradient is about 20°. It is interesting to note that a gradient direction differing by 20° can result in significantly improved performance. As the sample features converged to the planets or class centers, the MSE gradient direction converges to the cosine similarity gradient direction, since $\cos(x_i, p_{y_i}) \to 1$. This fact, coupled with superior performance of the cosine similarity, leads to the speculation that during the initial stages of training, when the features are not informative of the class structure, MSE or $l_2$ embedding gradients are noisier. Cosine embeddings obtain better gradients by ignoring this noise because it only looks at angular margins which are not affected by the norm of the vectors.

A method of improving the discrimination capabilities of derp neural networks, known as Copernican loss, has been presented wherein feature vectors are adjusted to minimize intra-class variation and maximize inter-class variation by learning a discriminative cosine embedding. Copernican loss discriminates between all samples from different classes within a batch of size m with just m gradient computations.

The invention claimed is:

1. A method, in a deep neural network, for training the network to learn an increased discrimination of feature vectors comprising:
  inputting a batch of training samples to the deep neural network;
  receiving a batch of feature vectors generated by the deep neural network; and
  refining the deep neural network by backpropagating a loss representing differences between the batch of feature vectors and ground truth results into the deep neural network, the loss determined by:
    a primary loss function; and
    a Copernican loss ($L_c$) comprising:
      a planetary loss function that minimizes intra-class variation of the feature vectors by minimizing a cosine distance of the feature vectors to their corresponding class centers; and a sun loss function that maximizes the inter-class variation of the feature vectors by maximizing a cosine distance of the feature vectors away from a mean of the batch of training samples;

wherein the Copernican loss is given by:

$$L_c = L_{primary} + \lambda L_p + L_s$$

where:

$\lambda$ is a loss weight;

$L_{Primary}$ is the primary loss function;

$L_p$ is the planetary loss function; and $L_s$ is the sun loss function.

2. The method of claim 1 wherein the Copernican loss function maintains a center for each class of feature vectors and computes a mean of the batch of feature vectors.

3. The method of claim 1 wherein the Copernican loss includes a loss weight enforcing a trade-off between the primary loss function and the Copernican loss.

4. The method of claim 1 wherein the Copernican loss is minimized using stochastic gradient descent.

5. The method of claim 1 wherein:

$$L_C = L_{Primary} + \lambda \underbrace{\left(\frac{1}{m}\sum_i^m (1 - \cos(x_i, p_{y_i}))\right)}_{L_P} + \underbrace{\left(\frac{1}{m}\sum_i^m \max(0, \cos(x_i, s), \beta)\right)}_{L_S}$$

where:

m is a batch size;

$x_i$ is an $i^{th}$ feature vector in the batch;

$P_{y_i}$ is a class center for a class in which feature vector $x_i$ is classified;

s is a mean of the batch; and $\beta$ is a margin for the sun loss function.

6. The method of claim 5 wherein:

$$s = \frac{1}{m}\sum_i^m x_i.$$

7. The method of claim 1 wherein each feature vector is adjusted based on a planetary loss gradient function representing a derivative of the planetary loss function with respect to each feature vector.

8. The method of claim 7 wherein the planetary loss gradient function is given by:

$$\frac{\partial L_P}{\partial x_i} = -\frac{1}{m}\sum_i^m \frac{1}{\|x_i\|_2}\left(\frac{p_{y_i}}{\|p_{y_i}\|_2} - \cos(x_i, p_{y_i})\frac{x_i}{\|x_i\|_2}\right).$$

9. The method of claim 7 wherein each feature vector is further adjusted based on a sun loss gradient function representing a derivative of the sun loss function with respect to each feature vector.

10. The method of claim 9 wherein the sun loss gradient function is given by:

$$\frac{\partial L_S}{\partial x_i} = \left\{\frac{1}{m}\sum_i^m \frac{1}{\|x_i\|_2}\left(\frac{s}{\|s\|_2} - \cos(x_i, s)\frac{x_i}{\|x_i\|_2}\right).\right.$$

11. The method of claim 1 wherein the primary loss function is selected from a group consisting of SoftMax, L2-Softmax, Large Margin Softmax, Angular Softmax, NormFace, AM-Softmax CosFace, ArcFace and Circle loss.

* * * * *

UNITED STATES PATENT AND TRADEMARK OFFICE
CERTIFICATE OF CORRECTION

PATENT NO. : 12,131,260 B2
APPLICATION NO. : 18/132509
DATED : October 29, 2024
INVENTOR(S) : Marios Savvides et al.

It is certified that error appears in the above-identified patent and that said Letters Patent is hereby corrected as shown below:

In the Claims

In Column 7, Claim 1, Line 8, "Lc = Lprimary + λLn + Ls" should read "Lc= LPrimary + λLp + Ls"

Signed and Sealed this
Seventeenth Day of December, 2024

Derrick Brent
*Acting Director of the United States Patent and Trademark Office*